US009510256B2

(12) United States Patent
Krishna et al.

(10) Patent No.: US 9,510,256 B2
(45) Date of Patent: Nov. 29, 2016

(54) SEAMLESS HANDOFF, OFFLOAD, AND LOAD BALANCING IN INTEGRATED WI-FI/SMALL CELL SYSTEMS (71) Applicant: wildfire.exchange, inc., San Francisco, CA (US)

(72) Inventors: Santhosh Krishna, Emerald Hills, CA (US); Andrea Goldsmith, Menlo Park, CA (US); Michael Carlton, Los Altos Hills, CA (US)

(73) Assignee: wildfire.exchange, inc., San Francisco, CA (US)

( * ) Notice: Subject to any disclaimer, the term of this patent is extended or adjusted under 35 U.S.C. 154(b) by 708 days.

(21) Appl. No.: 13/622,969

(22) Filed: Sep. 19, 2012

(65) Prior Publication Data
US 2013/0077482 A1 Mar. 28, 2013

Related U.S. Application Data (60) Provisional application No. 61/536,987, filed on Sep. 20, 2011.

(51) Int. Cl.
*H04W 36/22* (2009.01)
*H04W 36/00* (2009.01)
*H04W 36/14* (2009.01)

(52) U.S. Cl.
CPC ......... *H04W 36/22* (2013.01); *H04W 36/0011* (2013.01); *H04W 36/14* (2013.01)

(58) Field of Classification Search
None
See application file for complete search history.

(56) References Cited

U.S. PATENT DOCUMENTS

| 6,353,614 | B1 * | 3/2002 | Borella et al. ................ 370/389 |
| 7,991,399 | B2 | 8/2011 | Ganesan |
| 8,145,210 | B2 * | 3/2012 | Thalanany et al. ........ 455/432.1 |
| 8,477,785 | B2 * | 7/2013 | Kant et al. .................... 370/392 |
| 8,554,142 | B2 | 10/2013 | Hoover et al. |
| 8,665,819 | B2 | 3/2014 | Iyer et al. |
| 2005/0025164 | A1 * | 2/2005 | Kavanagh et al. .......... 370/401 |
| 2005/0266848 | A1 | 12/2005 | Kim |
| 2006/0121916 | A1 | 6/2006 | Aborn et al. |
| 2007/0072605 | A1 | 3/2007 | Poczo |
| 2007/0155386 | A1 | 7/2007 | Wahl et al. |
| 2007/0171871 | A1 | 7/2007 | Forsberg |
| 2007/0249291 | A1 | 10/2007 | Nanda et al. |
| 2007/0270152 | A1 * | 11/2007 | Nylander et al. ............. 455/445 |
| 2008/0096560 | A1 * | 4/2008 | Felske et al. ................ 455/436 |
| 2008/0207206 | A1 | 8/2008 | Taniuchi et al. |
| 2008/0214143 | A1 | 9/2008 | Heit et al. |

(Continued)

FOREIGN PATENT DOCUMENTS

GB 2414896 7/2005

*Primary Examiner* — Alex Skripnikov
(74) *Attorney, Agent, or Firm* — Clements Bernard PLLC; Lawrence A. Baratta, Jr.; Christopher L. Bernard (57) ABSTRACT A method of handing off between a cellular network and a Wi-Fi network is disclosed. A cellular base station of the cellular network is caused to collect information related to the cellular network. A Wi-Fi access point of the Wi-Fi network is caused to collect information related to the Wi-Fi network, wherein the cellular base station and the Wi-Fi access point are co-located. The information related to the cellular network and the information related to the Wi-Fi network are used collectively for determining whether to handoff traffic of a user equipment from a cellular air interface of the cellular network to a Wi-Fi air interface of the Wi-Fi network, or vice versa.

49 Claims, 8 Drawing Sheets

(56) References Cited

U.S. PATENT DOCUMENTS

| | | | |
|---|---|---|---|
| 2008/0279134 A1* | 11/2008 | Lee | H04B 7/155 370/315 |
| 2009/0017864 A1* | 1/2009 | Keevill et al. | 455/552.1 |
| 2010/0016022 A1* | 1/2010 | Liu | H04W 48/08 455/561 |
| 2010/0103862 A1* | 4/2010 | Ulupinar | H04L 29/12207 370/315 |
| 2011/0134770 A1* | 6/2011 | Lin et al. | 370/252 |
| 2011/0222523 A1 | 9/2011 | Fu et al. | |
| 2011/0261787 A1 | 10/2011 | Bachmann et al. | |
| 2012/0155386 A1* | 6/2012 | Krishnaswamy et al. | 370/328 |
| 2013/0287006 A1 | 10/2013 | Nix | |
| 2014/0079026 A1* | 3/2014 | Dimou et al. | 370/332 |

* cited by examiner

|  | IP Address | Network Attached | Authentication | MNO | S-GW GTP |
|---|---|---|---|---|---|
| UE1 |  |  |  |  |  |
| UE2 |  |  | . . . |  |  |

FIG. 4

| Device | Data Offload? | If Offload, NAT? | Session ID <src IP, port, dst IP, port, protocol> |
| --- | --- | --- | --- |
| UE1 | | | |
| UE1 | | | |
| UE2 | | | ... |
| | | | |

SEAMLESS HANDOFF, OFFLOAD, AND LOAD BALANCING IN INTEGRATED WI-FI/SMALL CELL SYSTEMS

CROSS REFERENCE TO OTHER APPLICATIONS

This application claims priority to U.S. Provisional Patent Application No. 61/536,987 entitled ALGORITHMS FOR DUAL-MODE WI-FI/PICOCELL HANDOVER AND OFFLOAD filed Sep. 20, 2011 which is incorporated herein by reference for all purposes.

BACKGROUND OF THE INVENTION

Internet Protocol based (IP-based) cellular networks, including cellular networks based on the fourth-generation (4G) Long Term Evolution (LTE) standard and on the Worldwide Interoperability for Microwave Access (Wi-MAX) standard, provide significantly higher data rates than previous generations of cellular networks. However, the spectrum allocated to cellular networks remains scarce, thus limiting the ability of fourth-generation and future-generation cellular networks to accommodate the growing demand for mobile data driven by mobile devices, including smartphones and the like. Therefore, improved techniques to utilize the limited cellular spectrum and to make use of non-cellular spectrum are desirable both in fourth-generation as well as future-generation cellular networks.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Internet Protocol based (IP-based) cellular networks, including cellular networks based on the fourth-generation (4G) Long Term Evolution (LTE) standard and on the Worldwide Interoperability for Microwave Access (Wi-MAX) standard, provide significantly higher data rates than previous generations of cellular networks. In addition, IP-based cellular networks are increasingly migrating from flat to hierarchical architectures in order to address capacity and coverage issues. In contrast to a flat cellular network, which includes mostly macrocells with high power (e.g., 10 to 40 Watts of transmit power) cellular base stations, a hierarchical cellular network includes macrocells and various levels of smaller cells (e.g., femtocells, picocells, and microcells) with lower power cellular base stations. The macrocells in a hierarchical cellular network can provide rapid deployment and wide area coverage, while the smaller cells can increase capacity through more extensive application of frequency reuse over smaller coverage areas with smaller number of users.

The aforementioned technical advances notwithstanding, the spectrum allocated to cellular networks remains scarce, thus limiting the ability of fourth-generation and future-generation cellular networks to accommodate the growing demand for mobile data driven by mobile devices, including smartphones and the like.

On the other hand, the spectrum allocated for Wi-Fi networks is significantly greater than that allocated for cellular networks. Moreover, the spectrum allocated to Wi-Fi networks is unlicensed, thus incurring no additional spectrum licensing costs to the Wi-Fi providers. Therefore, handoff and mobile data offloading from IP-based cellular networks to Wi-Fi networks may be attractive mechanisms to mitigate the spectrum scarcity faced by fourth-generation and future-generation IP-based cellular networks.

In some techniques, a handoff from a cellular to a Wi-Fi network may be initiated by a client (e.g., a connection manager) that is installed on a mobile device. For example, the client installed on a mobile device may initiate a handoff from a cellular network (e.g., a small cell network) to a Wi-Fi network after the Wi-Fi network is detected by the client. However, handoff initiated by a client simply switching from a cellular network to a Wi-Fi network has a number of drawbacks. For example, handing off in this manner would cause any existing sessions (e.g., Transmission Control Protocol (TCP) sessions) established on the cellular network to be terminated before new sessions are re-established on the Wi-Fi network. Although mobile device users may not notice much interruption when they are running certain types of applications, e.g., Internet browsing, on their mobile devices, they will likely experience a significant amount of disruption when running streaming applications, conducting a voice over Internet Protocol (VoIP) call, or accessing a virtual private network (VPN). In addition, client-initiated Wi-Fi handoffs require the client software to be constantly updated in order to support a diverse range of mobile devices that are available on the market. Furthermore, quality of service (QoS) is not supported because sessions are handed off from the cellular network to the Wi-Fi network without consideration of the conditions or loads of the networks, as such network operational conditions are generally not visible to the client on a mobile device. Therefore, improved techniques for handoffs between Wi-Fi and cellular networks are desirable.

Figure 1:
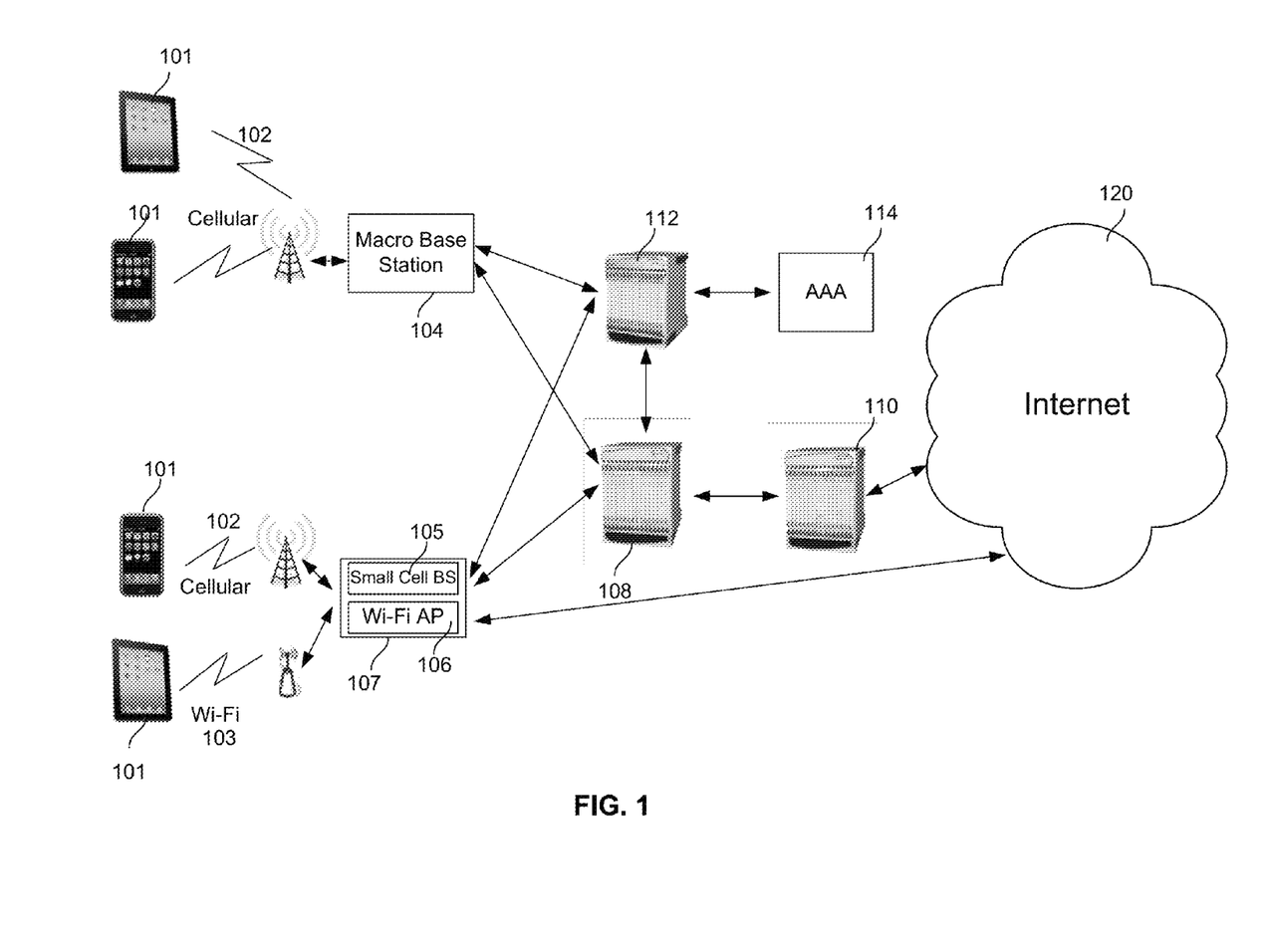
FIG. 1 is an exemplary block diagram illustrating a plurality of user equipment terminals (UEs) 101 establishing connections to the Internet (120) via either an IP-based cellular network 102 or a Wi-Fi network 103.

FIG. 1 is an exemplary block diagram illustrating a plurality of user equipment terminals (UEs) 101 establishing connections to the Internet (120) via either an IP-based cellular network 102 or a Wi-Fi network 103. A UE 101 may be any device used by an end-user to communicate, including a smartphone, a laptop computer or a tablet equipped with mobile broadband adapters, and the like.

FIG. 1 illustrates an embodiment of an IP-based cellular network 102 that is operated by a mobile network operator (MNO), e.g., Verizon Wireless or T-Mobile USA. An MNO is a provider of wireless communications services that owns or controls the elements to deliver services to an end-user, including radio spectrum allocation, wireless network infrastructure, back haul infrastructure, billing, customer care, and the like. Cellular network 102 provides UEs 101 with connectivity to other UEs and to different services and devices on the Internet 120.

Cellular network 102 may be any IP-based cellular core network, such as a 4G LTE network, a WiMAX network, and the like. UEs 101 obtain services from cellular network 102 by communicating wirelessly with a cellular base station, e.g., a macro base station 104 in a macrocell or a small cell base station 105 in a small cell. The cellular base station in turn communicates with other elements in cellular network 102. For example, elements in cellular network 102 include, but are not limited to, a radio-IP gateway 108, a cellular network gateway 110, a mobility management device 112, an authentication, authorization, and accounting (AAA) server 114, and a cellular network dynamic host configuration protocol (DHCP) server. AAA server 114 is a server that authenticates and authorizes a mobile user, and also provides accounting features to a billing server. A DHCP server is a server that allocates an IP address to a client. Cellular network gateway 110 is a gateway for routing and address allocation.

FIG. 1 further illustrates that UEs 101 may obtain services from a Wi-Fi network 103 via a Wi-Fi access point (Wi-Fi AP) 106. Wi-Fi AP 106 may be connected to a wide area network (WAN), which provides connectivity to the Internet (120). Wi-Fi network 103 may operate in a variety of settings, including a residential setting as a home Wi-Fi network, a commercial/retail setting as a Wi-Fi hotspot, or a business/office setting as an enterprise Wi-Fi network. As shown in FIG. 1, Wi-Fi AP 106 and a small cell base station 105 are co-located or virtually co-located as an integrated Wi-Fi and small cell (IWS) system 107. Virtually co-located means that Wi-Fi AP 106 and small cell base station 105 may not be located in a single location (e.g., located in a single piece of hardware), but they may be connected by control and data channels in such a way that they behave and perform as if they are co-located. Both control information and data packets, respectively, may be passed between small cell base station 105 and Wi-Fi AP 106 via control and data channels. In some embodiments, IWS system 107 may be operated by the MNO of cellular network 102. In some embodiments, IWS system 107 may be operated by a Wi-Fi service provider, and the Wi-Fi service provider may be affiliated with the MNO of cellular network 102 or may have an agreement with the MNO regarding handoff and mobile data offloading between the Wi-Fi and cellular networks.

IWS system 107 with handoff and other capabilities controls the handoff of a UE 101 from cellular to Wi-Fi, and vice versa. A handoff between cellular and Wi-Fi performed by IWS system 107 may include an air interface handoff only, i.e., a handoff between using cellular radio and using Wi-Fi radio for wireless communication. In addition, a handoff between cellular and Wi-Fi performed by IWS system 107 may further include mobile data network offloading, wherein mobile data is offloaded from the cellular network by not sending the mobile data through the MNO core network, but through an alternative path from IWS system 107 to the Internet (120). The criteria for handoff and network offloading are determined by IWS system 107 based on the conditions of cellular network 102 and Wi-Fi network 103, network policies, and the like. In some embodiments, no special client software is required on UE 101 for the handoff disclosed in the present application to work, because no action or coordination with the UE is required. In other embodiments, client software may enable the client to participate in the handoff process. Existing sessions (e.g., existing TCP sessions) established on cellular network 102 are preserved during handoff, thereby avoiding interruptions to any applications, e.g., streaming video, VoIP call, and VPN access, which are already running on UE 101. As will be described in greater detail below, IWS system 107 preserves the existing sessions by utilizing control and data interfaces between small cell base station 105 and Wi-Fi AP 106 co-located or virtually co-located in IWS system 107. In some embodiments, the handoff disclosed in the present application does not require mobile IP tunnels to be set up in order to work.

Figure 2:
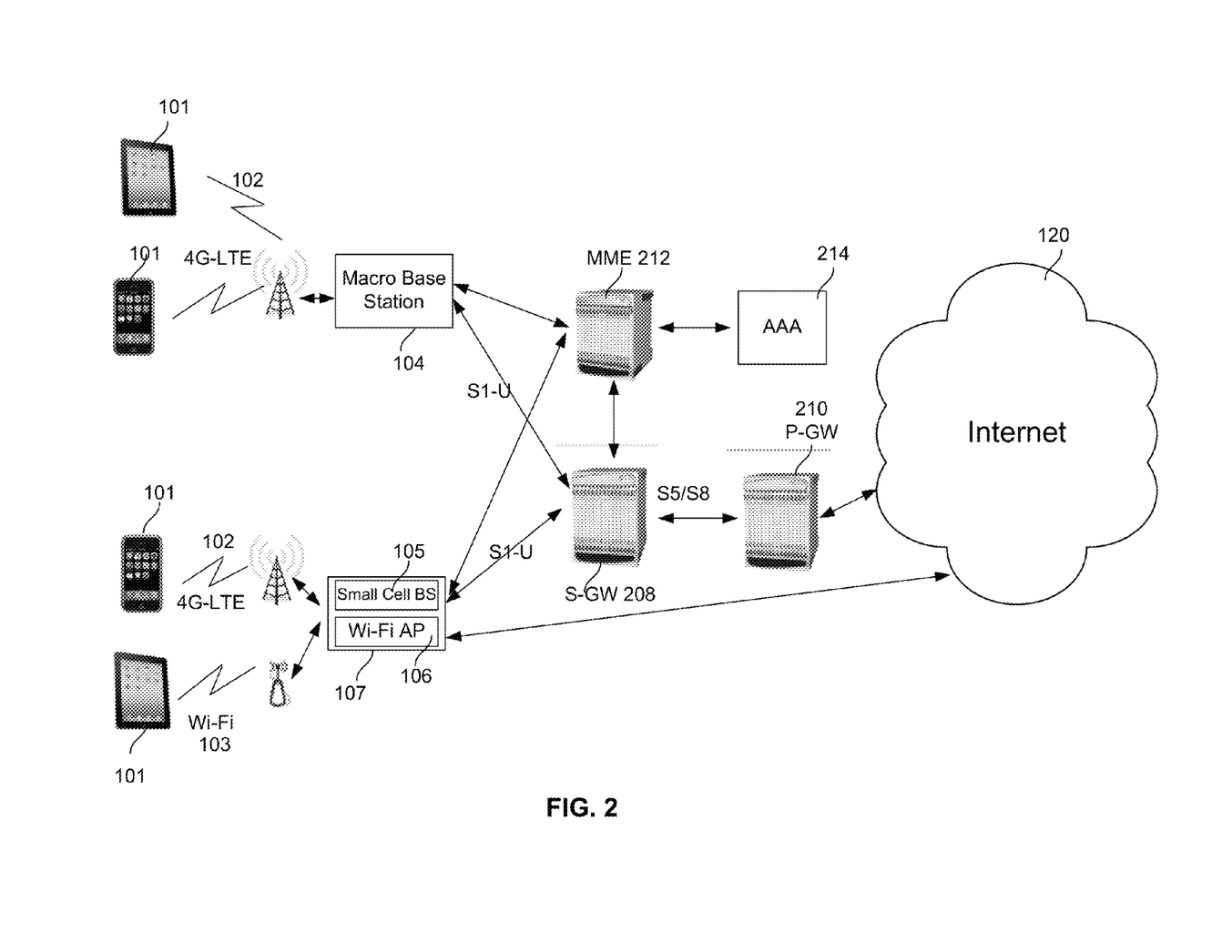
FIG. 2 is an exemplary block diagram illustrating a plurality of user equipment terminals (UEs) 101 establishing connections to the Internet (120) via either a 4G LTE cellular network 102 or a Wi-Fi network 103.

FIG. 2 is an exemplary block diagram illustrating a plurality of user equipment terminals (UEs) 101 establishing connections to the Internet (120) via either an IP-based cellular network 102 or a Wi-Fi network 103. FIG. 2 is similar to FIG. 1, except that cellular network 102 is shown as a generic IP-based cellular network in FIG. 1, whereas cellular network 102 is shown as a 4G LTE network in FIG. 2. For example, radio-IP gateway 108, cellular network gateway 110, and mobility management device 112 are replaced by a serving gateway (S-GW) 208, a packet gateway (P-GW) 210, and a mobility management entity (MME) 212, respectively.

Note that the techniques disclosed in the present application are applicable to any IP-based cellular network standard, including the 4G LTE network as shown in FIG. 2 and WiMAX networks. Therefore, even though the techniques may be disclosed using terminologies corresponding to a particular type of network/standard, the techniques disclosed in the present application should not be limited to one type of network/standard only.

With continued reference to FIG. 2, after a UE 101 connects to macro base station 104 via 4G-LTE radio, mobile data can be sent to and from the Internet (120) via GPRS Tunneling Protocol (GTP) tunnels. In particular, a GTP tunnel is established between macro base station 104 and S-GW 208 over a S1-U interface, and a GTP tunnel is established between S-GW 208 and P-GW 210 over a S5/S8 interface. Once the GTP tunnels are established, mobile data can be sent from the UE 101 to macro base station 104 and then through the GTP tunnels to the Internet (120). In addition, the UE 101 obtains an IP address via DHCP. In particular, P-GW 210 allocates an IP address for the UE 101 from the MNO IP address space. The assigned IP address is hereinafter referred to as the cellular network assigned IP address.

The UE 101 may be handed off from macro base station 104 to small cell base station 105 according to the 4G-LTE protocol. After the handoff, a new GTP tunnel is established between IWS system 107 and S-GW 208 over a S1-U interface. Once the new GTP tunnel is established, mobile data can be sent from the UE 101 to small cell base station 105 in IWS system 107 and then through the GTP tunnels to the Internet (120).

The UE 101 may be further handed off from small cell base station 105 to Wi-Fi AP 106, and vice versa. A handoff between cellular and Wi-Fi performed by IWS system 107 may include an air interface handoff only, i.e., a handoff between using cellular radio and using Wi-Fi radio for wireless communication. In addition, a handoff between cellular and Wi-Fi performed by IWS system 107 may further include mobile data network offloading, wherein mobile data is offloaded from the cellular network by not sending the mobile data through the MNO core network, but through an alternative path from IWS system 107 to the Internet (120).

IWS system 107 may determine when and whether to handoff between cellular and Wi-Fi based on a set of criteria. The set of criteria may be based on any combination of network policies and characteristics, QoS requirements of the UE (such as whether the UE is a subscriber with premium services or standard services), the type of application (e.g., video versus HTTP traffic), pricing, network performance, load-balancing metrics, and the like. The set of criteria for determining a handoff from cellular to Wi-Fi and the set of criteria for determining a handoff from Wi-Fi back to cellular may be the same or different.

Because small cell base station 105 and Wi-Fi AP 106 are co-located or virtually co-located as IWS system 107, IWS system 107 has access to information corresponding to cellular network 102 and Wi-Fi network 103 that can be considered together for making handoff decisions. For example, IWS system 107 may consider network policies including the policy of the mobile network operator (MNO), the policy of the Wi-Fi network backhaul provider (e.g., the DSL service provider or the cable network service provider), and/or the policy of the local network (e.g., the network access policy of an enterprise). IWS system 107 may also consider real time network performance data, load-balancing metrics, and backhaul capability and performance corresponding to cellular network 102 and Wi-Fi network 103 for making handoff decisions. Performance and load-balancing metrics may include the level of traffic congestion, the degree of latency, the throughput, or other metrics. In some embodiments, IWS system 107 may make handoff decisions in order to optimize the individual performance of a UE. In some embodiments, IWS system 107 may make handoff decisions in order to optimize the aggregate cellular network performance or the aggregate Wi-Fi network performance. In some embodiments, IWS system 107 may make handoff decisions based on pricing or cost information corresponding to cellular network 102 and Wi-Fi network 103, including per-minute call rates, cellular minutes used, and the like.

In some embodiments, IWS system 107 may determine when and whether to handoff between cellular and Wi-Fi on a session-by-session basis. For example, IWS system 107 may determine that some sessions of a UE should be switched from using cellular radio to using Wi-Fi radio and that the remaining sessions of the UE should continue to use cellular radio. In another example, IWS system 107 may determine to offload network data corresponding to some but not all of the sessions of n UE from the MNO network. In some embodiments, IWS system 107 may determine when and whether to handoff between cellular and Wi-Fi for all sessions of a UE collectively.

Criteria for handing off from a cellular network to a Wi-Fi network may include, but are not limited to, one or more of the following:

All data sessions are handed off from the cellular network to the Wi-Fi network, whereas all voice sessions are maintained on the cellular network;

All cellular traffic is handed off to the Wi-Fi network whenever the Wi-Fi network is detected;

All cellular traffic is handed off to the Wi-Fi network when the quality of the cellular link falls below a given performance target;

All high-priority data or data requiring a given QoS remain on the cellular network, and all other data are handed off to the Wi-Fi network;

The quality of a UE's cellular and Wi-Fi connections are monitored, and handoff from the cellular network to the Wi-Fi network occurs if the Wi-Fi network is expected to deliver better performance.

Criteria for handing off from a Wi-Fi network to a cellular network may include, but are not limited to, one or more of the following:

All voice sessions (e.g., Skype VoIP sessions) are handed off from the Wi-Fi network to the cellular network, whereas all data sessions are maintained on the Wi-Fi network.

All Wi-Fi traffic or Wi-Fi traffic requiring a given QoS are handed off to the cellular network when the quality of the Wi-Fi link falls below a given performance target.

All high-priority data or data requiring a given QoS are handed off to the cellular network, and all other data remain on the Wi-Fi network All bandwidth-intensive traffic (e.g., video) remains on the Wi-Fi network unless the Wi-Fi network cannot support the traffic's required QoS while the cellular network can support the required QoS. All other Wi-Fi traffic requiring a given QoS is handed off to the cellular network. All traffic not requiring a given QoS remains on the Wi-Fi network.

The quality of a UE's cellular and Wi-Fi connections are monitored, and handoff from the Wi-Fi network to the cellular network occurs if the cellular network is expected to deliver better performance.

Some UEs 101 may be pre-programmed with a given network preference (e.g., pre-programmed to always use a Wi-Fi network when available). Under this situation, if the handoff criteria determine that the UE should use the cellular network for access, IWS system 107 may block or deny any Wi-Fi network access by the UE 101 so as to enforce a handoff from the Wi-Fi network to the cellular network. Alternatively, UEs 101 may be enabled to set the network it connects to based on a control command, in which case the control command would be issued by IWS system 107.

In some embodiments, IWS system 107 may be further configured to receive from a UE 101 information about the UE which can be used as one of many criteria for making handoff decisions. For example, the UE 101 may send performance data about the UE or end-user preference information to IWS system 107 for making handoff decisions.

Typically, a UE 101 may be handed off from a small cell to a macrocell or from a small cell to another small cell based on base station signal strength. In some embodiments, IWS system 107 may configure its range extension parameters such that there is a bias against handing off a UE 101 back to a macro base station or back to a small cell base station without the Wi-Fi handoff and offload capabilities disclosed in the present application. The advantage of configuring such a bias is that the UE 101 may be able to obtain better service or establish a better connection, since IWS system 107 has the ability to more intelligently determine whether the UE 101 should stay in the cellular network or move to the Wi-Fi network based on a more extensive set of criteria.

Figure 3:
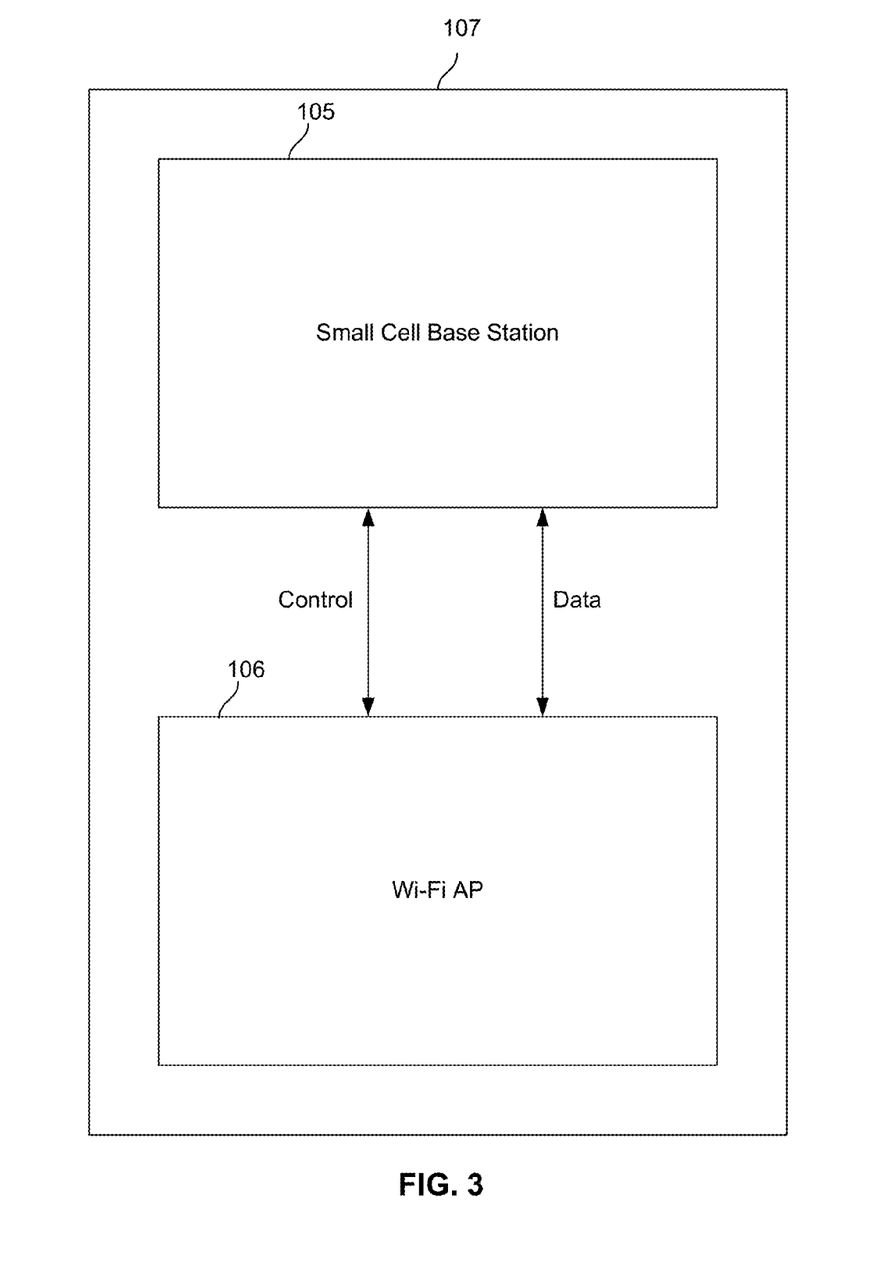
FIG. 3 is a block diagram illustrating an embodiment of an integrated Wi-Fi and small cell system (IWS) for seamless handoff, data offloading, and load balancing between a cellular network and a Wi-Fi network.

FIG. 3 is a block diagram illustrating an embodiment of an integrated Wi-Fi and small cell system for seamless handoff and data offloading between a cellular network and a Wi-Fi network. In some embodiments, the integrated system in FIG. 3 is IWS system 107, as depicted in FIGS. 1 and 2. As shown in FIG. 3, IWS system 107 includes small cell base station 105 and Wi-Fi AP 106. Both control information and data may be passed between small cell base station 105 and Wi-Fi AP 106 via control and data channels. The control information may include, but is not limited to, IP addresses for UEs, cryptographic keys, and QoS parameters. The data that is passed between small cell base station 105 and Wi-Fi AP 106 may include IP packets that are sent to and from the UEs that are serviced by IWS system 107.

Figure 4:
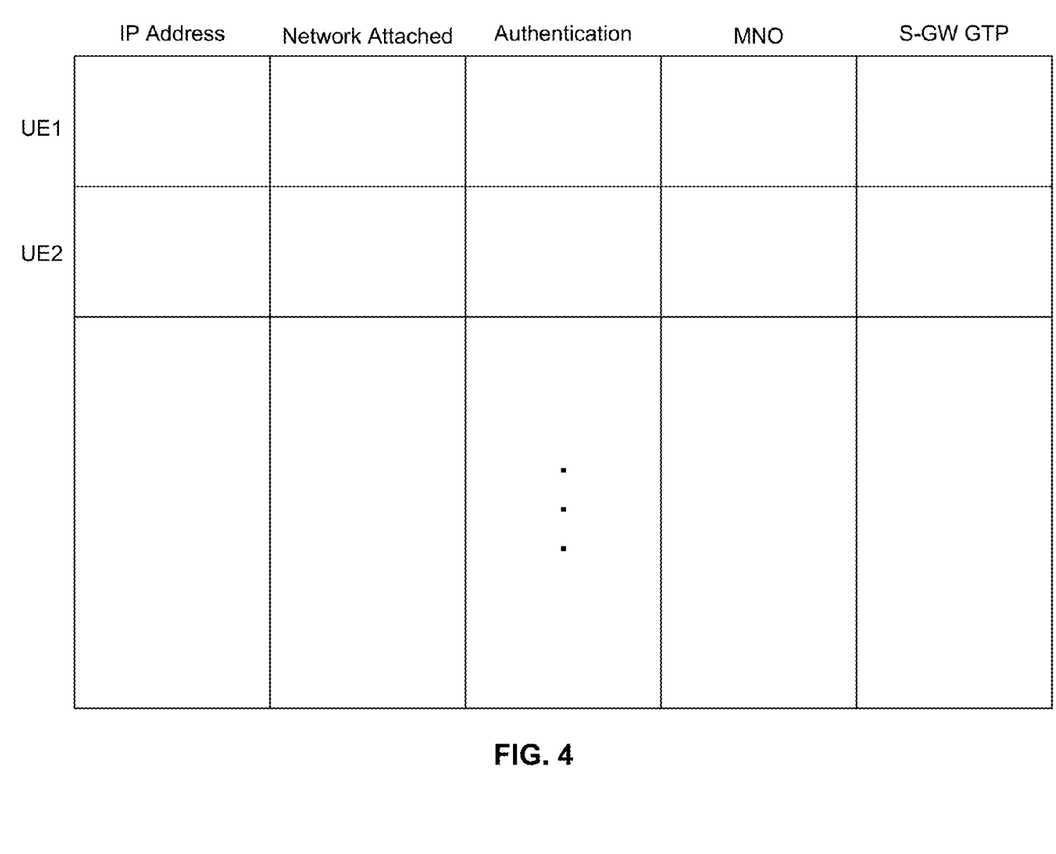
FIG. 4 is a diagram illustrating an embodiment of a state table for storing the states of all the UEs that are serviced by IWS system 107.

FIG. 4 is a diagram illustrating an embodiment of a state table for storing the states of all the UEs that are serviced by IWS system 107. Each entry of the state table may include the IP address of the UE, the network (i.e., cellular or Wi-Fi) that the UE is attached to, the authentication information of the UE, the MNO for the UE, and any information that specifies the GTP tunnel, e.g., tunnel ID.

Figure 5:
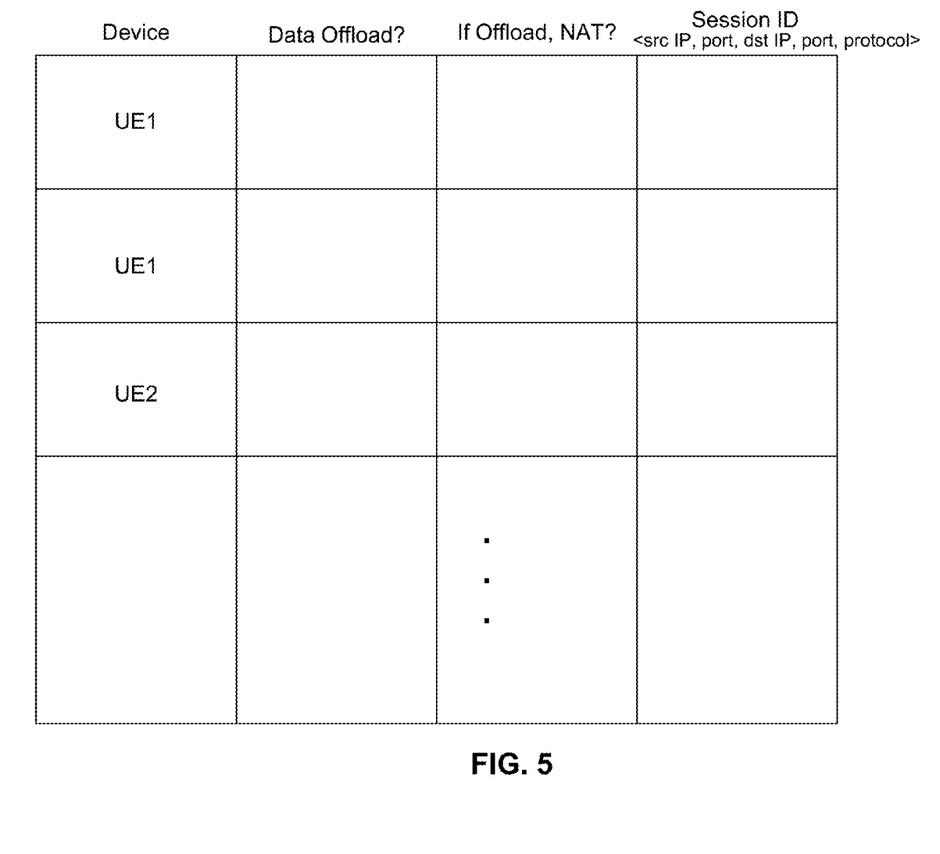
FIG. 5 is a diagram illustrating an embodiment of a session table for storing session information in IWS system 107.

FIG. 5 is a diagram illustrating an embodiment of a session table for storing session information in IWS system 107. Each entry of the session table may include the UE's identification (UE's ID). Each entry of the session table may also indicate whether a particular session's data is offloaded and whether network address translation (NAT) is used if the session's data is offloaded. Each entry of the session table may also include information that identifies the session.

Figure 6:
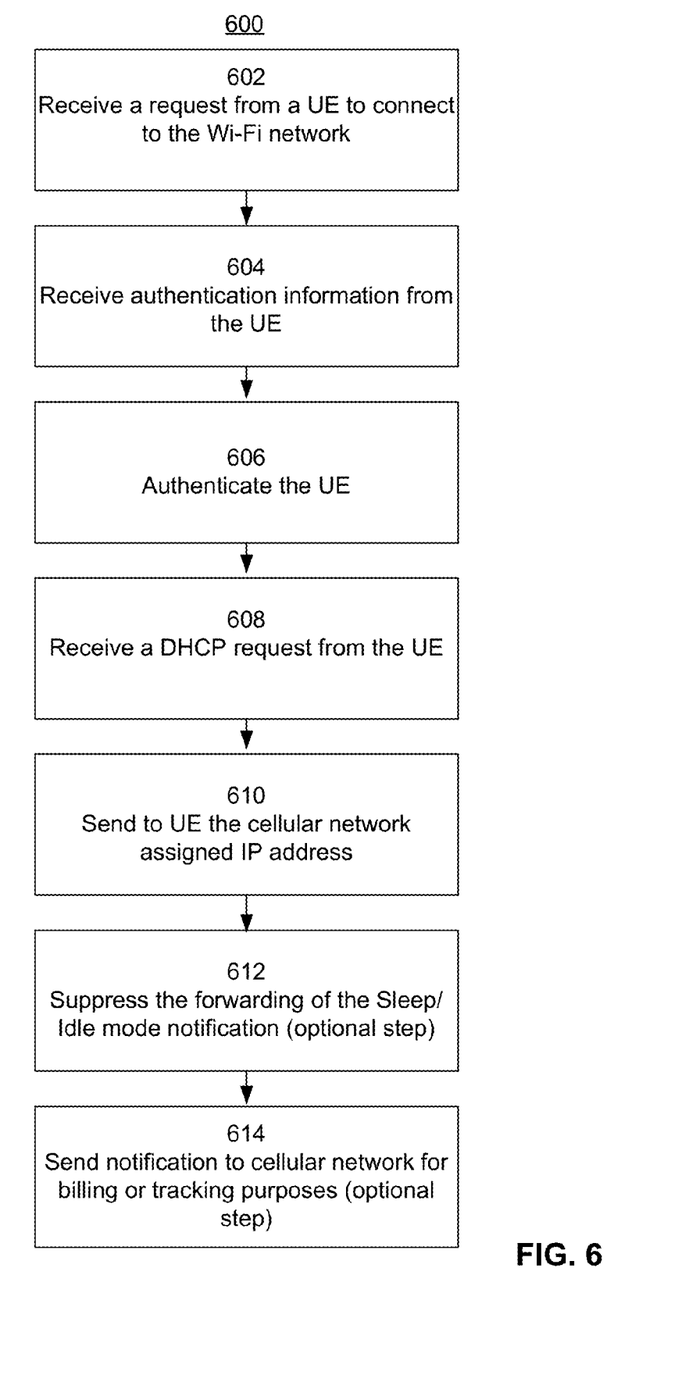
FIG. 6 is a flow chart illustrating an embodiment of a process 600 for an air interface handoff of a UE from a cellular network to a Wi-Fi network.

FIG. 6 is a flow chart illustrating an embodiment of a process 600 for an air interface handoff of a UE from cellular to Wi-Fi. In some embodiments, process 600 is a process that runs on IWS system 107. In some embodiments, process 600 is run after IWS system 107 has already determined that there should be an air interface handoff from cellular to Wi-Fi based on a set of criteria, as described above. In describing process 600 below, an LTE network is selected as an illustrative example of a cellular network; however, other IP-based cellular networks (e.g., WiMAX) may be used as well.

With reference to FIG. 2 and FIG. 6, a request from a UE 101 to connect to Wi-Fi network 103 is received by IWS system 107 at 602. For example, when a UE 101 that is already connected to small cell base station 105 moves within range of Wi-Fi network 103, UE 101 sends a request to IWS system 107, requesting to be attached to Wi-Fi network 103. In response, IWS system 107 initiates an authentication process. At 604, the authentication information sent by UE 101 is received by IWS system 107.

At 606, IWS system 107 authenticates UE 101. Authentication of UE 101 by IWS system 107 can be performed in different ways. In some embodiments, the authentication information sent by UE 101 is relayed by IWS system 107 to the AAA server 214 associated with the MNO. AAA server 214 authenticates UE 101 and sends a confirmation to IWS system 107. In some other embodiments, IWS system 107 authenticates UE 101 using cached authentication information. IWS system 107 is able to authenticate UE 101 without contacting AAA server 214 because UE 101 has previously been authenticated by AAA server 214 when UE 101 requested IWS system 107 to attach it to small cell base station 105, and because the previously obtained authentication results from AAA server 214 have been cached in IWS system 107.

At 608, a DHCP request issued by UE 101 requesting for an IP address to be allocated to the UE is intercepted by IWS system 107. At 610, in response to the DHCP request sent by UE 101, IWS system 107 sends to UE 101 the cellular network assigned IP address that was previously allocated to UE 101 for connecting to the cellular network. After UE 101 receives the cellular network assigned IP address, UE 101 may begin to send data using the Wi-Fi radio. Since UE 101 is no longer transmitting or receiving on the 4G-LTE interface, UE 101 may then enter 4G-LTE Sleep/Idle mode.

At 612, IWS system 107 may optionally suppress the forwarding of the Sleep/Idle mode notification to the MNO's core elements (e.g., MME 212, S-GW 208, and AAA server 214), preventing the established GTP tunnels in the MNO network from being torn down. As a result, any data that is now being sent from UE 101 via Wi-Fi radio to Wi-Fi AP 106 may be passed to small cell base station 105 through one or more data channels and then sent through the previously established GTP tunnels in the MNO network, thereby maintaining any existing sessions and their corresponding policies, QoS, and accounting features. Note that under this process, Mobile IP is not required to seamlessly handoff UE 101 from one air interface to another. Another advantage of maintaining the GTP tunnels is that the amount of session-setup overhead and control traffic on the MNO core elements can be significantly reduced. For example, the amount of control traffic is reduced because GTP tunnels do not need to be torn down and then re-established later when UE 101 is handed back to the cellular network.

At 614, IWS system 107 may optionally notify the MNO (e.g., AAA server 214) that UE 101 is now using the Wi-Fi air interface. The notification may be used by the MNO for billing, tracking, quality control, and other purposes. For example, the MNO may be able to bill the end-user of UE 101 at a different rate. The MNO may also distinguish a handoff from other conditions, including a call being dropped because of a poor connection or the phone being turned off by the end-user.

As described above, IWS system 107 may determine to offload data corresponding to some, but not all, of the sessions of a UE from the MNO network. Accordingly, as will be described in greater detail below, packets received by IWS system 107 from a UE are forwarded differently based on a number of factors, including whether the packets belong to an existing session or a new session, whether offloading is used, or whether NAT is used.

Figure 7:
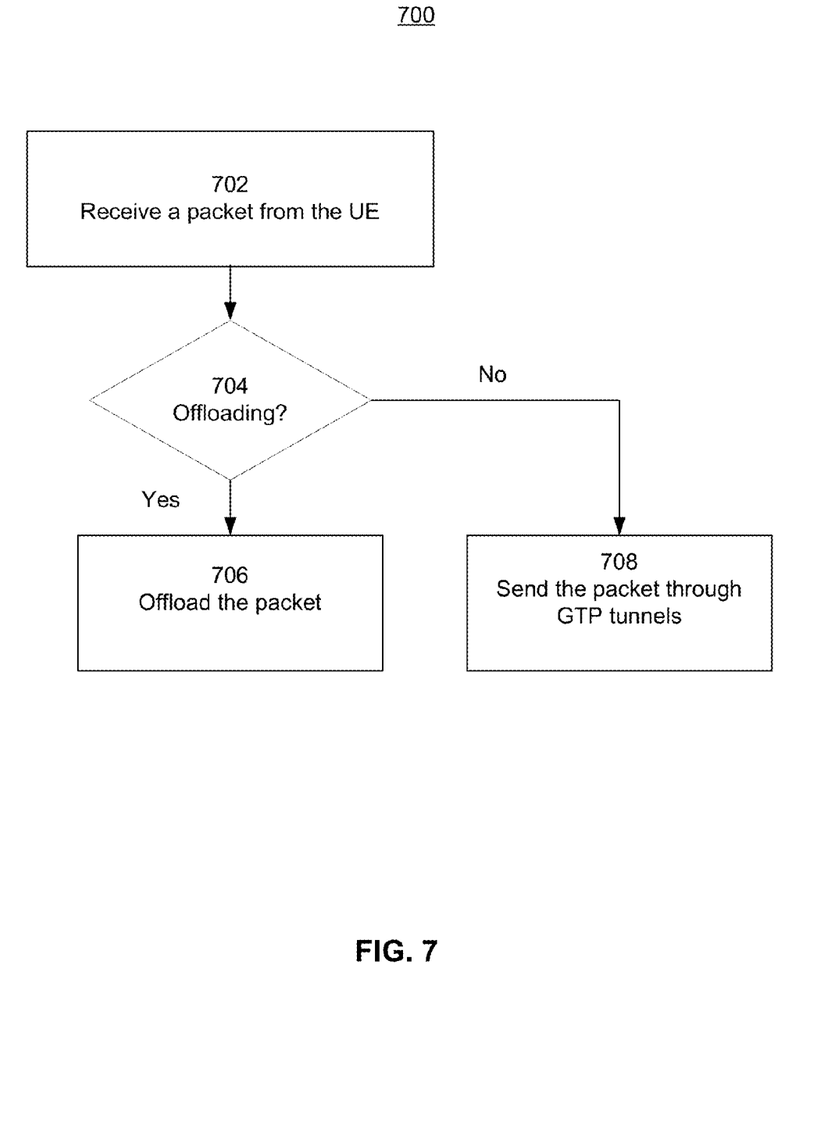
FIG. 7 is a flow chart illustrating an embodiment of a process 700 for forwarding packets of an existing session of a UE.

FIG. 7 is a flow chart illustrating an embodiment of a process 700 for forwarding packets of an existing session of a UE. At 702, Wi-Fi AP 106 of IWS system 107 receives a packet from the UE. At 704, IWS system 107 determines whether the packet corresponds to a session of the UE that should be offloaded from the MNO network, e.g., by consulting the session table as shown in FIG. 5.

If the packet corresponds to a session of the UE that should be offloaded from the MNO network, then the packet can be sent directly from IWS system 107 to the Internet, without being sent through GTP tunnels established on the MNO core network (see 706 of process 700). For example, the packet can be sent from IWS system 107 to the Internet through a WAN connection. For seamless offloading, the source IP address of the packet sent from IWS system 107 to the Internet is the cellular network assigned IP address. As a result, any response packets that are sent from the Internet back to the UE will go through the previously established GTP tunnels on the MNO core network. In other words, the outgoing packets from the UE are offloaded from the MNO core network, while the returning packets will stay on the MNO core network.

If the packet corresponds to a session of the UE that should not be offloaded from the MNO network, then the packet can be passed from Wi-Fi AP 106 to small cell base station 105 through one or more data channels and then sent through the previously established GTP tunnels in the MNO core network (see 708 of process 700), thereby maintaining any existing sessions and their corresponding policies, QoS, and accounting features. Note that in this case, packets from the UE to the Internet and packets from the Internet back to the UE will be sent through the GTP tunnels that were previously established on the MNO network.

Figure 8:
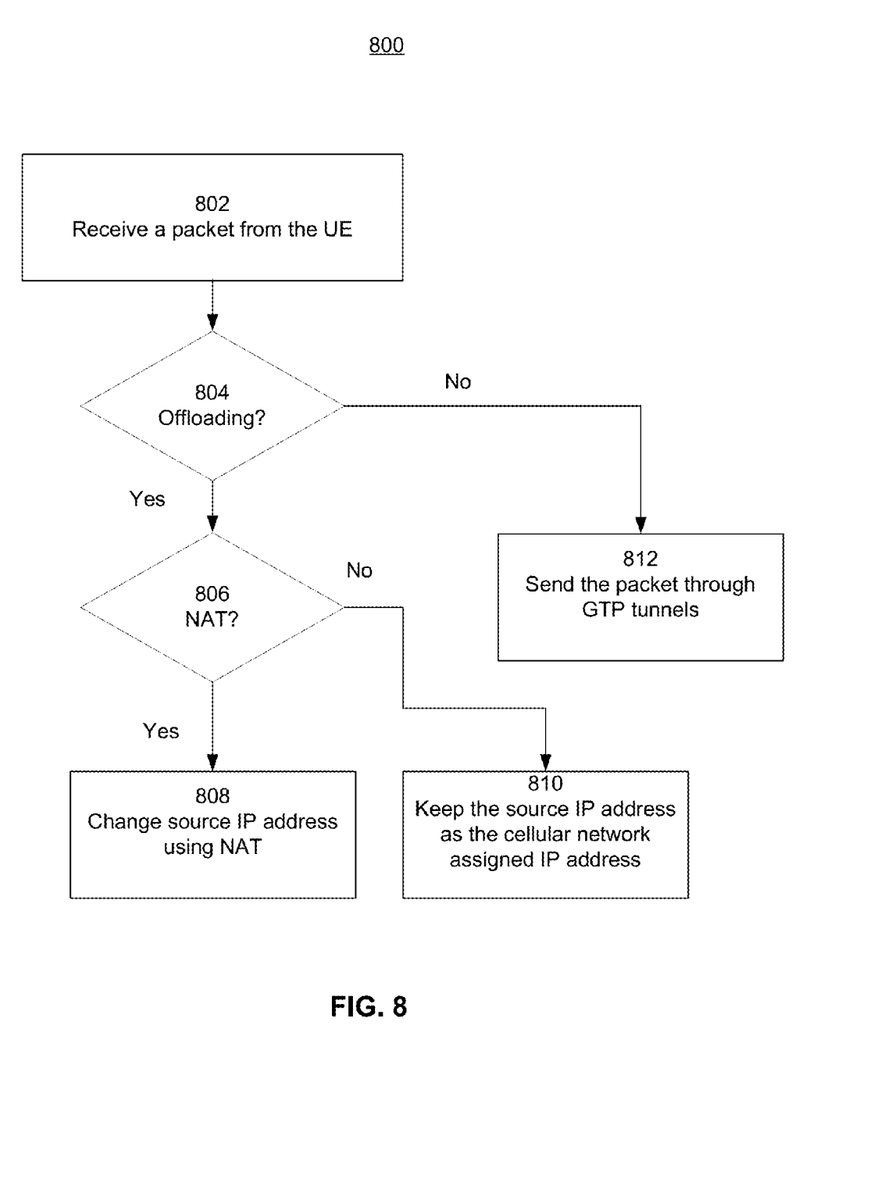
FIG. 8 is a flow chart illustrating an embodiment of a process 800 for forwarding packets of a new session of a UE.

FIG. 8 is a flow chart illustrating an embodiment of a process 800 for forwarding packets of a new session of a UE. At 802, Wi-Fi AP 106 of IWS system 107 receives a packet from the UE. At 804, IWS system 107 determines whether the packet corresponds to a session of the UE that should be offloaded from the MNO network, e.g., by consulting the session table as shown in FIG. 5.

If the packet corresponds to a session of the UE that should be offloaded from the MNO network, then the packet can be sent directly from IWS system 107 to the Internet, without being sent through GTP tunnels that were previously established on the MNO core network. For example, the packet can be sent from IWS system 107 to the Internet through a WAN connection. At 806, IWS system 107 determines whether NAT should be used to translate the source IP address of the packet before it is sent out by IWS system 107. If NAT is used, then the source IP address is translated to the WAN address of the IWS system 107 using NAT before the packet is forwarded at 808. Otherwise, the source IP address of the packet will be kept as the cellular network assigned IP address and will not be translated using NAT at 810. In the latter case, any response packets that are sent from the Internet back to the UE will go through the previously established GTP tunnels on the MNO core network. In other words, the outgoing packets from the UE are offloaded from the MNO network, while the returning packets will stay on the MNO network.

If the packet corresponds to a session of the UE that should not be offloaded from the MNO network, then the packet can be passed from Wi-Fi AP 106 to small cell base station 105 through one or more data channels and then sent through the previously established GTP tunnels in the MNO network (see 812 of process 800). Note that in this case, packets from the UE to the Internet and packets from the Internet back to the UE will be sent through the GTP tunnels that were previously established on the MNO network prior to the air interface handoff.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of handing off between a cellular network and a Wi-Fi network, comprising:
   causing a cellular base station of the cellular network to collect information related to the cellular network;
   causing a Wi-Fi access point of the Wi-Fi network to collect information related to the Wi-Fi network, wherein the cellular base station and the Wi-Fi access point are integrated and co-located at a single physical location or virtually co-located, wherein co-located comprises connected by control and data channels in such a way that control information and data packets of the cellular base station and the Wi-Fi access point may be passed directly to each other;
   using the information related to the cellular network and the information related to the Wi-Fi network collectively for determining whether to handoff traffic of a user equipment from a cellular air interface of the cellular network to a Wi-Fi air interface of the Wi-Fi network, or vice versa;
   sending data packets from the Wi-Fi access point to the cellular base station, wherein the data packets correspond to traffic of the user equipment that has been handed off from the cellular air interface of the cellular network to the Wi-Fi air interface of the Wi-Fi network, wherein the data packets are further sent by the cellular base station through tunnels established on the cellular network prior to the handoff; and
   intercepting a dynamic host configuration protocol (DHCP) request sent by the user equipment and responding to the request by sending a cellular network assigned IP address to be used by the user equipment as its IP address on the Wi-Fi network, wherein the cellular network assigned IP address was previously assigned to the user equipment as its IP address on the cellular network.

2. The method of claim 1, wherein collecting information related to the cellular network comprises collecting real time performance data of the cellular network at the cellular base station, wherein the real time performance data includes one or more of the following: a level of traffic congestion, a degree of latency, a level of throughput, and a load-balancing metric.

3. The method of claim 1, wherein collecting information related to the Wi-Fi network comprises collecting real time performance data of the Wi-Fi network at the Wi-Fi access point, wherein the real time performance data includes one or more of the following: a level of traffic congestion, a degree of latency, a level of throughput, and a load-balancing metric.

4. The method of claim 1, wherein collecting information related to the cellular network comprises accessing a network policy of a mobile network operator (MNO).

5. The method of claim 1, wherein collecting information related to the Wi-Fi network comprises accessing a network policy of a Wi-Fi service provider.

6. The method of claim 1, further comprising:
collecting additional information, wherein the additional information includes one or more of the following: information related to pricing or cost information corresponding to the cellular network and the Wi-Fi network, quality of service (QoS) information, and application information; and
using the additional information for determining whether to handoff traffic of the user equipment from the cellular air interface of the cellular network to the Wi-Fi air interface of the Wi-Fi network, or vice versa.

7. The method of claim 1, further comprising:
receiving additional information from the user equipment; and
using the additional information from the user equipment for determining whether to handoff traffic of the user equipment from the cellular air interface of the cellular network to the Wi-Fi air interface of the Wi-Fi network, or vice versa.

8. The method of claim 1, wherein determining whether to handoff traffic of the user equipment comprises determining a portion of traffic of the user equipment to be handed off.

9. The method of claim 8, wherein the portion of traffic comprises traffic corresponding to a session.

10. The method of claim 1, further comprising:
configuring a bias against the cellular base station handing off traffic of the user equipment to another cellular base station.

11. The method of claim 10, wherein configuring the bias comprises configuring a range extension parameter.

12. The method of claim 1, further comprising authenticating the user equipment for traffic of the user equipment to be handed off to the Wi-Fi air interface, wherein authenticating comprises authenticating based at least in part on cached authentication information, and wherein the cached authentication information corresponds to a prior authentication of the user equipment for using the cellular air interface.

13. The method of claim 12, wherein authenticating the user equipment for traffic of the user equipment to be handed off to the Wi-Fi air interface based at least in part on cached authentication information comprises avoiding a contact with an authentication, authorization, and accounting (AAA) server for authentication.

14. The method of claim 1, further comprising suppressing forwarding of a Sleep/Idle mode notification to the cellular network and preventing existing GPRS Tunneling Protocol (GTP) tunnels established on the cellular network to be torn down in response to a handoff of traffic of the user equipment from the cellular air interface of the cellular network to the Wi-Fi air interface of the Wi-Fi network.

15. The method of claim 1, wherein the traffic that has been handed off corresponds to a session that was established before the handoff and is preserved after the handoff.

16. The method of claim 15, wherein the session is preserved without using Mobile IP protocol.

17. The method of claim 16, wherein the data packets are associated with a same or substantially same quality of service (QoS) before and after the handoff.

18. The method of claim 1, further comprising notifying the cellular network that traffic of the user equipment has been handed off from the cellular air interface of the cellular network to the Wi-Fi air interface of the Wi-Fi network.

19. The method of claim 18, wherein the notification can be used by the cellular network for one or more of the following purposes: billing, tracking, and quality control.

20. The method of claim 1, further comprising:
determining whether to offload network data based at least in part on the information related to the cellular network and the information related to the Wi-Fi network; and
network offloading, wherein network offloading comprises sending data packets received from the user equipment through a path outside the cellular network, and wherein the data packets correspond to traffic of the user equipment that has been handed off from the cellular air interface of the cellular network to the Wi-Fi air interface of the Wi-Fi network.

21. The method of claim 20, wherein the traffic that has been handed off corresponds to a session that was established before the handoff and is preserved after the handoff.

22. The method of claim 20, wherein sending data packets through a path outside the cellular network comprises sending the data packets through a wide area network (WAN) to the Internet.

23. The method of claim 20, further comprising translating a source IP address of the data packets using network address translation (NAT), and wherein the source IP address prior to the translation comprises an IP address previously assigned by the cellular network.

24. The method of claim 1, wherein the cellular network comprises a small cell cellular network.

25. A system for handing off between a cellular network and a Wi-Fi network, comprising:
a processor; and
a memory coupled with the processor, wherein the memory is configured to provide the processor with instructions which when executed cause the processor to:
cause a cellular base station of the cellular network to collect information related to the cellular network;
cause a Wi-Fi access point of the Wi-Fi network to collect information related to the Wi-Fi network, wherein the cellular base station and the Wi-Fi access point are integrated and co-located at a single physical location or virtually co-located, wherein co-located comprises connected by control and data channels in such a way that control information and data packets of the cellular base station and the Wi-Fi access point may be passed directly to each other;
use the information related to the cellular network and the information related to the Wi-Fi network collectively for determining whether to handoff traffic of a user equipment from a cellular air interface of the cellular network to a Wi-Fi air interface of the Wi-Fi network, or vice versa;
send data packets from the Wi-Fi access point to the cellular base station, wherein the data packets correspond to traffic of the user equipment that has been handed off from the cellular air interface of the cellular network to the Wi-Fi air interface of the Wi-Fi network, wherein the data packets are further sent by the cellular base station through tunnels established on the cellular network prior to the handoff;
suppress forwarding of a Sleep/Idle mode notification to the cellular network; and prevent existing GPRS Tunneling Protocol (GTP) tunnels established on the cellular network to be torn down in response to a handoff of traffic of the user equipment from the cellular air interface of the cellular network to the Wi-Fi air interface of the Wi-Fi network.

26. The system of claim 25, wherein collecting information related to the cellular network comprises collecting real time performance data of the cellular network at the cellular base station, and wherein the real time performance data includes one or more of the following: a level of traffic congestion, a degree of latency, a level of throughput, and a load-balancing metric.

27. The system of claim 25, wherein collecting information related to the Wi-Fi network comprises collecting real time performance data of the Wi-Fi network at the Wi-Fi access point, and wherein the real time performance data includes one or more of the following: a level of traffic congestion, a degree of latency, a level of throughput, and a load-balancing metric.

28. The system of claim 25, wherein collecting information related to the cellular network comprises accessing a network policy of a mobile network operator (MNO).

29. The system of claim 25, wherein collecting information related to the Wi-Fi network comprises accessing a network policy of a Wi-Fi service provider.

30. The system of claim 25, wherein the memory is further configured to provide the processor with instructions which when executed cause the processor to:
collect additional information, wherein the additional information includes one or more of the following: information related to pricing or cost information corresponding to the cellular network and the Wi-Fi network, quality of service (QoS) information, and application information; and
use the additional information for determining whether to handoff traffic of the user equipment from the cellular air interface of the cellular network to the Wi-Fi air interface of the Wi-Fi network, or vice versa.

31. The system of claim 25, wherein the memory is further configured to provide the processor with instructions which when executed cause the processor to:
receive additional information from the user equipment; and
use the additional information from the user equipment for determining whether to handoff traffic of the user equipment from the cellular air interface of the cellular network to the Wi-Fi air interface of the Wi-Fi network, or vice versa.

32. The system of claim 25, wherein determining whether to handoff traffic of the user equipment comprises determining a portion of traffic of the user equipment to be handed off.

33. The system of claim 32, wherein the portion of traffic comprises traffic corresponding to a session.

34. The system of claim 25, wherein the memory is further configured to provide the processor with instructions which when executed cause the processor to:
configure a bias against the cellular base station handing off traffic of the user equipment to another cellular base station.

35. The system of claim 34, wherein configuring the bias comprises configuring a range extension parameter.

36. The system of claim 25, wherein the memory is further configured to provide the processor with instructions which when executed cause the processor to:
authenticate the user equipment for traffic of the user equipment to be handed off to the Wi-Fi air interface, wherein authenticating comprises authenticating based at least in part on cached authentication information, and wherein the cached authentication information corresponds to a prior authentication of the user equipment for using the cellular air interface.

37. The system of claim 36, wherein authenticating the user equipment for traffic of the user equipment to be handed off to the Wi-Fi air interface based at least in part on cached authentication information comprises avoiding a contact with an authentication, authorization, and accounting (AAA) server for authentication.

38. The system of claim 25, wherein the memory is further configured to provide the processor with instructions which when executed cause the processor to:
intercept a dynamic host configuration protocol (DHCP) request sent by the user equipment; and
respond to the request by sending a cellular network assigned IP address to be used by the user equipment as its IP address on the Wi-Fi network, wherein the cellular network assigned IP address was previously assigned to the user equipment as its IP address on the cellular network.

39. The system of claim 25, wherein the traffic that has been handed off corresponds to a session that was established before the handoff and is preserved after the handoff.

40. The system of claim 39, wherein the session is preserved without using Mobile IP protocol.

41. The system of claim 40, wherein the data packets are associated with a same or substantially same quality of service (QoS) before and after the handoff.

42. The system of claim 25, wherein the memory is further configured to provide the processor with instructions which when executed cause the processor to:
notify the cellular network that traffic of the user equipment has been handed off from the cellular air interface of the cellular network to the Wi-Fi air interface of the Wi-Fi network.

43. The system of claim 42, wherein the notification can be used by the cellular network for one or more of the following purposes: billing, tracking, and quality control.

44. The system of claim 25, wherein the memory is further configured to provide the processor with instructions which when executed cause the processor to:
determine whether to offload network data based at least in part on the information related to the cellular network and the information related to the Wi-Fi network; and
network offload, wherein network offloading comprises sending data packets received from the user equipment through a path outside the cellular network, and wherein the data packets correspond to traffic of the user equipment that has been handed off from the cellular air interface of the cellular network to the Wi-Fi air interface of the Wi-Fi network.

45. The system of claim 44, wherein the traffic that has been handed off corresponds to a session that was established before the handoff and is preserved after the handoff.

46. The system of claim 44, wherein sending data packets through a path outside the cellular network comprises sending the data packets through a wide area network (WAN) to the Internet.

47. The system of claim 44, wherein the memory is further configured to provide the processor with instructions which when executed cause the processor to:
translate a source IP address of the data packets using network address translation (NAT), and wherein the source IP address prior to the translation comprises an IP address previously assigned by the cellular network.

48. The system of claim 25, wherein the cellular network comprises a small cell cellular network.

49. A computer program product for handing off between a cellular network and a Wi-Fi network, the computer program product being embodied in a tangible non-transitory computer readable storage medium and comprising computer instructions for:

causing a cellular base station of the cellular network to collect information related to the cellular network;

causing a Wi-Fi access point of the Wi-Fi network to collect information related to the Wi-Fi network, wherein the cellular base station and the Wi-Fi access point are integrated and co-located at a single physical location or virtually co-located, wherein co-located comprises connected by control and data channels in such a way that control information and data packets of the cellular base station and the Wi-Fi access point may be passed directly to each other;

using the information related to the cellular network and the information related to the Wi-Fi network collectively for determining whether to handoff traffic of a user equipment from a cellular air interface of the cellular network to a Wi-Fi air interface of the Wi-Fi network, or vice versa;

sending data packets from the Wi-Fi access point to the cellular base station, wherein the data packets correspond to traffic of the user equipment that has been handed off from the cellular air interface of the cellular network to the Wi-Fi air interface of the Wi-Fi network, wherein the data packets are further sent by the cellular base station through tunnels established on the cellular network prior to the handoff;

determining whether to offload network data based at least in part on the information related to the cellular network and the information related to the Wi-Fi network;

network offloading, wherein network offloading comprises sending data packets received from the user equipment through a path outside the cellular network, and wherein the data packets correspond to traffic of the user equipment that has been handed off from the cellular air interface of the cellular network to the Wi-Fi air interface of the Wi-Fi network; and translating a source IP address of the data packets using network address translation (NAT), and wherein the source IP address prior to the translation comprises an IP address previously assigned by the cellular network.

* * * * *